(12) United States Patent
Campbell

(10) Patent No.: US 8,773,464 B2
(45) Date of Patent: Jul. 8, 2014

(54) METHODS AND SYSTEMS FOR COLLABORATIVE-WRITING-SURFACE IMAGE FORMATION

(75) Inventor: Richard John Campbell, Camas, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 239 days.

(21) Appl. No.: 12/882,923

(22) Filed: Sep. 15, 2010

(65) Prior Publication Data
US 2012/0062594 A1 Mar. 15, 2012

(51) Int. Cl.
*G09G 5/00* (2006.01)

(52) U.S. Cl.
USPC .......................................................... 345/632

(58) Field of Classification Search
CPC ..... G06F 3/005; G06F 3/0425; G06T 19/006; G06T 11/00
USPC .................................................. 345/632, 633
See application file for complete search history.

(56) References Cited

U.S. PATENT DOCUMENTS

| | | | |
|---|---|---|---|
| 5,025,314 A * | 6/1991 | Tang et al. | 348/14.08 |
| 5,414,228 A | 5/1995 | Yamashita | |
| 5,455,906 A | 10/1995 | Usuda | |
| 5,515,491 A | 5/1996 | Bates et al. | |
| 5,528,290 A | 6/1996 | Saund | |
| 5,889,889 A | 3/1999 | Sinden | |
| 6,411,732 B1 | 6/2002 | Saund | |
| 6,507,865 B1 | 1/2003 | Hanson et al. | |
| 6,806,903 B1 | 10/2004 | Okisu et al. | |
| 6,963,334 B1 | 11/2005 | Stevens et al. | |
| 6,970,600 B2 | 11/2005 | Abe | |
| 7,024,456 B1 | 4/2006 | Simonoff | |
| 7,171,056 B2 | 1/2007 | Zhang et al. | |
| 7,197,751 B2 | 3/2007 | Fedotov et al. | |
| 7,224,847 B2 * | 5/2007 | Zhang et al. | 382/254 |
| 7,249,314 B2 | 7/2007 | Walker et al. | |
| 7,260,257 B2 | 8/2007 | Zhang et al. | |
| 7,260,278 B2 | 8/2007 | Zhang et al. | |

(Continued)

FOREIGN PATENT DOCUMENTS

JP 05-330289 A 12/1993
JP 2007-166245 A 6/2007

OTHER PUBLICATIONS

Ross Cutler, The Distributed Meetings System, Apr. 2003, 2003 IEEE International Conference on Acoustics, Speech, and Signal Processing Proceedings (ICASSP '03), vol. 4, pp. IV-756 to IV-759.*

(Continued)

*Primary Examiner* — Jeffery A Brier
(74) *Attorney, Agent, or Firm* — Kristine Elizabeth Matthews; David C. Ripma

(57) ABSTRACT

Aspects of the present invention relate to methods and systems for capturing, sharing and recording the information on a collaborative writing surface. According to a first aspect of the present invention, currently persistent collaborative-writing-surface content may be imaged during periods of occlusion by an occluder. According to a second aspect of the present invention, the occluder may be imaged as transparent allowing the visibility of the occluded currently persistent collaborative-writing-surface content. According to a third aspect of the present invention, the occluder may be imaged as a silhouette allowing visibility of the occluded currently persistent collaborative-writing-surface content.

16 Claims, 6 Drawing Sheets

(56) References Cited

U.S. PATENT DOCUMENTS

| | | | |
|---|---|---|---|
| 7,301,548 | B2 | 11/2007 | Zhang et al. |
| 7,355,584 | B2 | 4/2008 | Hendriks et al. |
| 7,372,993 | B2 | 5/2008 | Lagardere et al. |
| 7,397,504 | B2 | 7/2008 | Cutler |
| 7,426,297 | B2 | 9/2008 | Zhang et al. |
| 7,428,000 | B2 | 9/2008 | Cutler et al. |
| 8,639,032 | B1 * | 1/2014 | Voorhees et al. ............ 382/176 |
| 2001/0035976 | A1 | 11/2001 | Poon |
| 2004/0165768 | A1 * | 8/2004 | Zhang et al. ................. 382/162 |
| 2004/0181577 | A1 | 9/2004 | Skurikhin et al. |
| 2004/0263646 | A1 * | 12/2004 | Cutler ........................... 348/239 |
| 2005/0078192 | A1 | 4/2005 | Sakurai et al. |
| 2005/0104864 | A1 | 5/2005 | Zhang et al. |
| 2006/0200755 | A1 | 9/2006 | Melmon et al. |
| 2007/0156816 | A1 | 7/2007 | Zhang et al. |
| 2007/0222747 | A1 | 9/2007 | Kritt et al. |
| 2008/0028325 | A1 | 1/2008 | Ferren et al. |
| 2008/0069441 | A1 | 3/2008 | Forutanpour |
| 2008/0177771 | A1 | 7/2008 | Vaugn |
| 2009/0172101 | A1 | 7/2009 | Arthursson |
| 2010/0245563 | A1 | 9/2010 | Golovchinsky et al. |
| 2011/0169776 | A1 | 7/2011 | Ouchi |

OTHER PUBLICATIONS

Ross Cutler, Yong Rui, Anoop Gupta, JJ Cadiz, Ivan Tashev, Li-wei He, Alex Colburn, Zhengyou Zhang, Zicheng Liu, and Steve Silverberg, Distributed Meetings: A Meeting Capture and Broadcasting System, 2002, Proceeding Multimedia '02, Proceedings of the tenth ACM international conference on Multimedia, pp. 503 to 512.*

Zhengyou Zhang and Li-wei He, Remote Collaboration on Physical Whiteboards, 2005, Advances in Multimedia Information Processing-PCM 2004 Lecture Notes in Computer Science, vol. 3331/2005, pp. 105-113.*

Japanese Office Action—Patent Application No. 2011-201713—Mailing Date Sep. 11, 2012.

USPTO Office Action—U.S. Appl. No. 12/636,533—Notification Date Mar. 15, 2012.

USPTO Office Action—U.S. Appl. No. 12/697,076—Notification Date Apr. 26, 2012.

USPTO Office Action—U.S. Appl. No. 12/697,076—Notification Date Dec. 20, 2012.

USPTO Office Action—U.S. Appl. No. 12/636,533—Notification Date Nov. 20, 2012.

Japanese Office Action—Patent Application No. 2010-276044—Mailing Date Feb. 7, 2012.

Takuro Sakiyama, Masayuki Mukunoki, Katsuo Ikeda, Shigeyoshi Iizuka, and Masahiko Tsujimoto, "Editing Video Stream of Blackboard for Archiving," The 58th National Convention of Information Processing Society of Japan, Mar. 9, 1999, Aggregate Corporation of Information Processing Society.

Japanese Office Action—Patent Application No. 2011-201713—Mailing Date Apr. 23, 2013.

* cited by examiner

METHODS AND SYSTEMS FOR COLLABORATIVE-WRITING-SURFACE IMAGE FORMATION

FIELD OF THE INVENTION

Embodiments of the present invention relate generally to collaboration systems and, in particular, to methods and systems for image update and sharing based on occlusion detection.

BACKGROUND

Flipcharts, whiteboards, chalkboards and other physical writing surfaces may be used to facilitate a creative interaction between collaboration participants. Methods and systems for capturing the information on these surfaces, referred to as collaborative writing surfaces, without hindering the creative interaction; allowing the captured information to be shared seamlessly and naturally between non-co-located parties; and generating a record of the interaction that may be subsequently accessed and replayed may be desirable.

SUMMARY

Some embodiments of the present invention comprise methods and systems for capturing, sharing and recording the information on a collaborative writing surface.

According to a first aspect of the present invention, some embodiments of the present invention comprise methods and systems to allow currently persistent collaborative writing-surface content maintained in a prior result image to be visible during periods of occlusion by an occluder.

According to a second aspect of the present invention, in some embodiments of the present invention, an occluder may be imaged as partially transparent, and the occluded portions of the present frame may be rendered based on corresponding portions of the prior result image.

According to a third aspect of the present invention, in some embodiments of the present invention, an occluder may be imaged as a silhouette, and the occluded portions of the present frame may be rendered based on corresponding portions of the prior result image.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention, but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Flipcharts, whiteboards, chalkboards and other physical writing surfaces may be used to facilitate a creative interaction between collaboration participants. Methods and systems for capturing the information on these surfaces, referred to as collaborative writing surfaces, without hindering the creative interaction; allowing the captured information to be shared seamlessly and naturally between non-co-located parties; and generating a record of the interaction that may be subsequently accessed and replayed may be desirable.

Some embodiments of the present invention comprise methods for forming an image of a collaborative writing surface, and in some of the exemplary embodiments described herein, the method may be implemented in a computing device. Embodiments of the present invention comprise methods and systems for capturing, sharing and recording the information on a collaborative writing surface. Exemplary collaborative writing surfaces may include a flipchart, a whiteboard, a chalkboard, a piece of paper and other physical writing surfaces.

Figure 1:
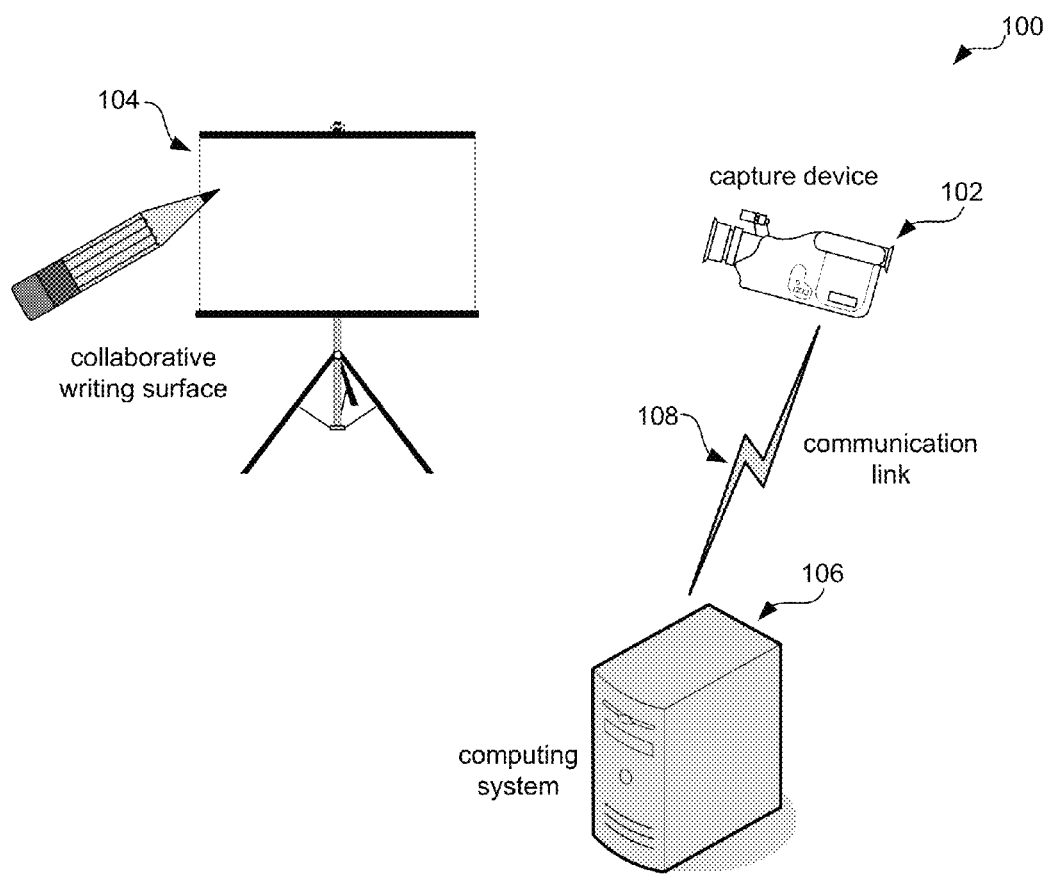
FIG. 1 is a picture depicting an exemplary collaboration system, according to some embodiments of the present invention, comprising a collaborative writing surface, an image acquisition system, a computing system and a communication link between the image acquisition system and the computing system.

Some embodiments of the present invention may comprise a collaboration system 100 that may be described in relation to FIG. 1. The collaboration system 100 may comprise a video camera, capture device or other image acquisition system, 102 that is trained on a collaborative writing surface 104. In some embodiments of the present invention, color image data may be acquired by the capture device 102. In alternative embodiments, the capture device 102 may acquire black-and-white image data. The capture device 102 may be communicatively coupled to a host computing system 106. Exemplary host computing systems 106 may comprise a single computing device or a plurality of computing devices. In some embodiments of the present invention, wherein the host computing system 106 comprises a plurality of computing devices, the computing devices may be co-located. In alternative embodiments of the present invention, wherein the host computing system 106 comprises a plurality of computing devices, the computing devices may not be co-located.

The connection 108 between the capture device 102 and the host computing system 106 may be any wired or wireless communication link.

In some embodiments of the present invention, the capture device 102 may be placed at an off-axis viewpoint that is non-perpendicular to the collaborative writing surface 104 to provide a minimally obstructed view of the collaborative writing surface 104 to local collaboration participants.

The capture device 102 may obtain image data associated with the collaborative writing surface 104. In some embodiments, the image data may be processed, in part, by a processor on the capture device 102 and, in part, by the host computing system 106. In alternative embodiments, the image data may be processed, in whole, by the host computing system 106.

In some embodiments of the present invention, raw sensor data obtained by the capture device 102 may be demosaiced and rendered. Demosaicing may reconstruct coincident three-color output data from non-coincident samples obtained by a camera filter array. Exemplary embodiments of the present invention may comprise a Bayer filter array in the capture device 102 and may comprise methods and systems known in the art for demosaicing color data obtained from a Bayer filter array. Alternative demosaicing methods and systems known in the art may be used when the capture device 102 sensor array is a non-Bayer filter array.

Figure 2:
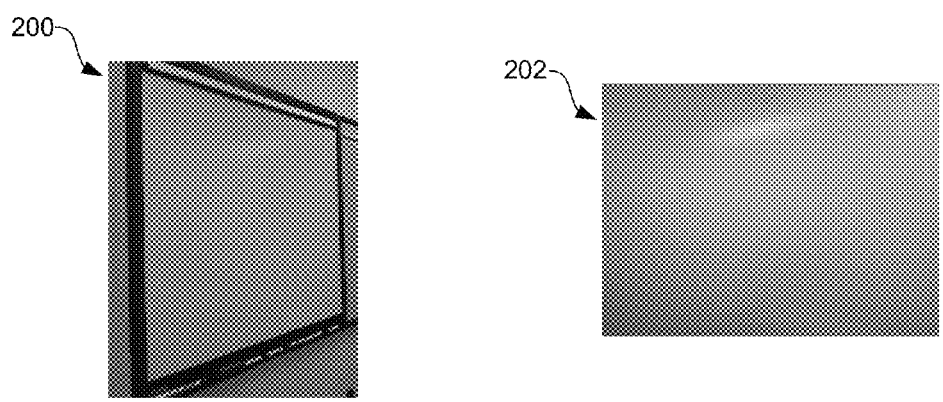
FIG. 2 is a picture depicting an exemplary camera-view image of a exemplary collaborative writing surface and a rectified image showing an exemplary view of the collaborative writing surface after the removal of perspective distortion introduced by an off axis placement of the camera relative to the collaborative writing surface.

In some embodiments of the present invention, the collaboration system 100 may comprise an image rectifier to eliminate, in the rendered image data, perspective distortion introduced by the relative position of the capture device 102 and the collaborative writing surface 104. FIG. 2 depicts an exemplary camera-view image 200 and the associated image 202 after geometric transformation to eliminate perspective distortion.

Figure 3:
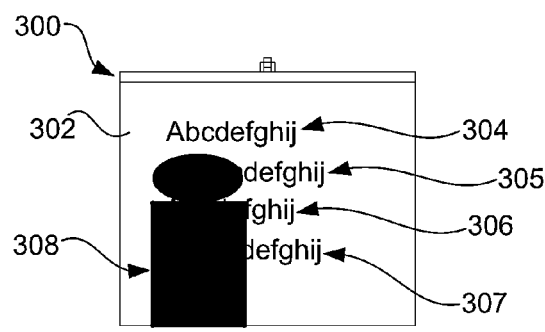
FIG. 3 is a picture depicting an image of a collaborative writing surface, according to some embodiments of the present invention, in which the collaborative writing surface is partially occluded by an occluder.

When a participant in a collaboration session changes the content on a collaborative writing surface, the participant may occlude a portion of the collaborative writing surface from view during all, or a portion, of the time during which he is changing the collaborative-writing-surface content. A participant may be referred to as an occluder, an actor or a scribe, during this time. It may be desirable for a collaborative-writing-surface capture-system rendering of the collaborative writing surface to effectively minimize the obstruction of collaborative writing surface by the occluder during the collaboration session. For example, consider FIG. 3 which depicts an image 300 an exemplary collaborative writing surface 302 on which there are four lines 304-307 of text "Abcdefghij" and of which three lines 305-307 are partially occluded 308 by a collaboration participant who may be changing the content on the collaborative writing surface 302. Thus, during the time, or a portion thereof, a portion of the collaborative writing surface may not be visible to collaboration participants.

Figure 4:
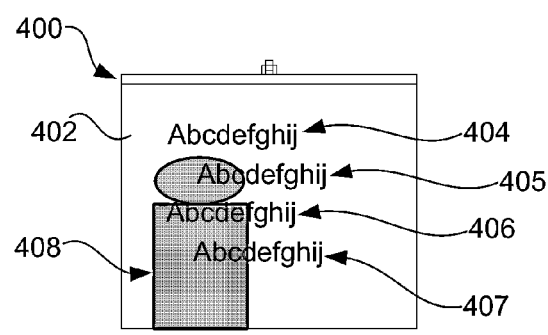
FIG. 4 is a picture depicting an image of a collaborative writing surface, according to some embodiments of the present invention, in which an occluder in the scene is imaged as partially transparent, thereby allowing prior content to be visible in the image.
Figure 5:
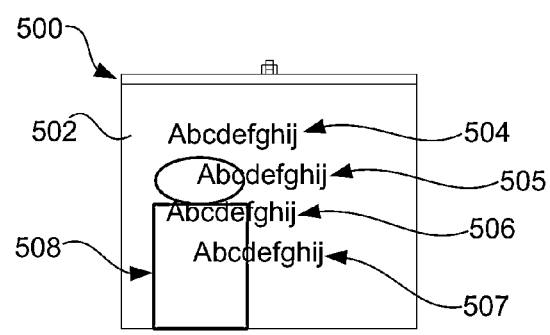
FIG. 5 is a picture depicting an image of a collaborative writing surface, according to some embodiments of the present invention, in which an occluder in the scene is imaged as a silhouette, thereby allowing prior content to be visible in the image.

According to some embodiments of the present invention, the region of the collaborative writing surface that is occluded by the occluder may be imaged, during the occlusion period, as a version of the prior-imaged, also considered currently persistent, content of the region in which the version of the currently persistent content is readily visible and understood by a collaboration participant. In some embodiments of the present invention, the occluder may be imaged as, at least partially, transparent allowing the prior-imaged content of the region to be seen. FIG. 4 depicts an image 400 of an exemplary collaborative writing surface 402 on which there are four lines 404-407 of text "Abcdefghij" and of which three lines 405-407 are partially occluded 408 by a collaboration participant who may be changing the content on the collaborative writing surface 402. In this exemplary image 400, the occluder is imaged as a partially transparent region 408 through which the currently persistent content may be viewed. In alternative embodiments of the present invention, an occluder may be imaged as a silhouette through which the currently persistent content may be viewed. These alternative embodiments may be understood in relation to FIG. 5 which depicts an image 500 of an exemplary collaborative writing surface 502 on which there are four lines 504-507 of text "Abcdefghij" and of which three lines 505-507 are partially occluded 508 by a collaboration participant who may be changing the content on the collaborative writing surface 502. According to some embodiments of the present invention, the occluder may be imaged as a silhouette 508 through which the currently persistent content may be viewed.

Embodiments of the present invention comprise methods and systems for capturing, sharing and recording the information on a collaborative writing surface and may allow currently persistent content to be visible during periods of occlusion by an occluder. Exemplary collaborative writing surfaces may include a flipchart, a whiteboard, a chalkboard, a piece of paper and other physical writing surfaces.

Figure 6:
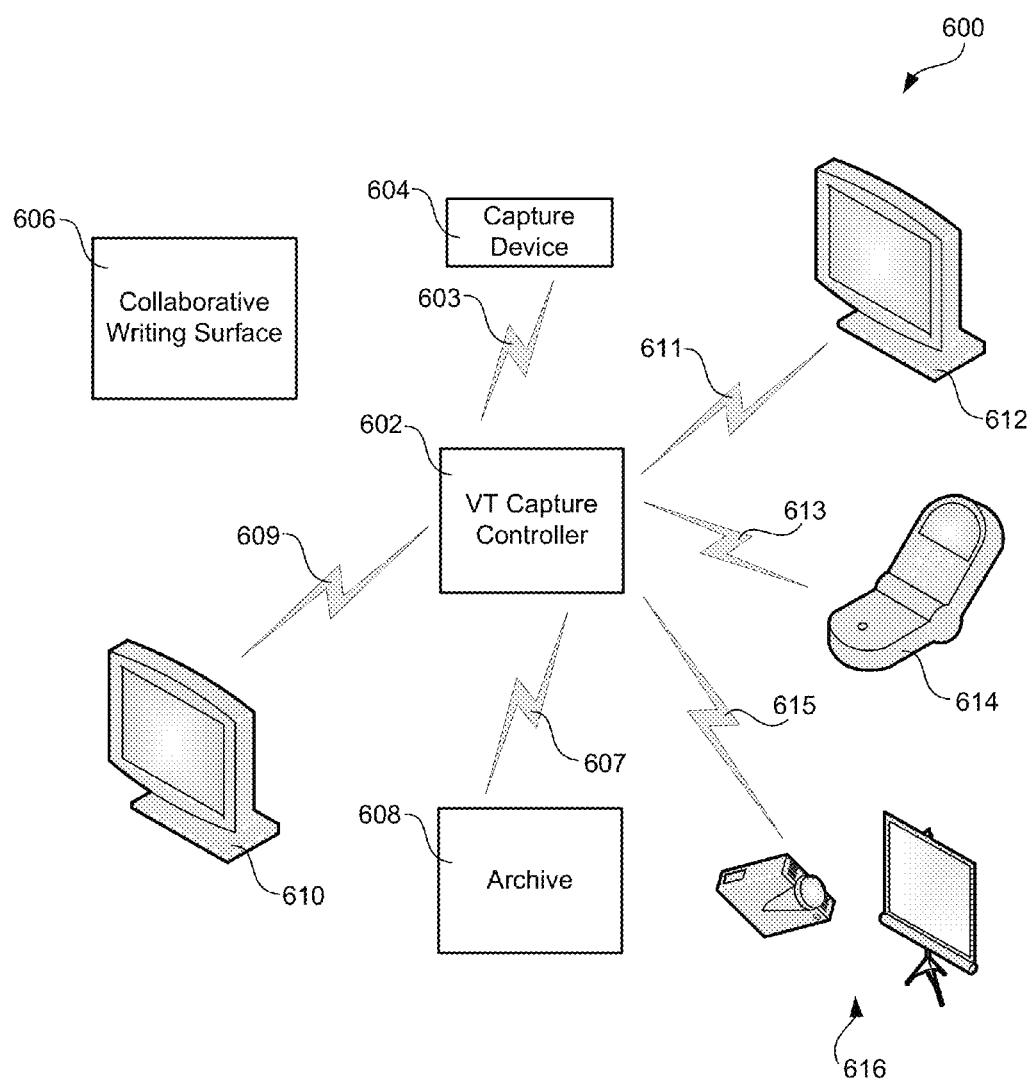
FIG. 6 is a picture depicting an exemplary collaboration system, according to some embodiments of the present invention, comprising a virtual-transparency capture controller.

Some embodiments of the present invention may be understood in relation to FIG. 6. A collaboration system 600 may comprise a virtual-transparency (VT) capture controller 602 which may process and analyze a video stream provided by a capture device 604 to which the VT capture controller 602 may be communicatively coupled. The capture device may provide a video stream associated with a collaborative writing surface 606 on which the capture device 604 may be trained. The connection 603 between the capture device 604 and the VT capture controller 602 may be any wired or wireless communication link or network link. The VT capture controller 602 may process and analyze the video stream to render and control the broadcast media streams to other system components. For example, the VT capture controller 602 may be communicatively coupled to an archive 608 in which a record of the collaboration session may be stored. The connection 607 between the archive 608 and the VT capture controller 602 may be any wired or wireless communication link or network link. The VT capture controller 602 may be communicatively coupled to one, or more, remote displays (three shown 612, 614, 616) in addition to a local display 610. The connection 609 between the local display 610 and the VT capture controller 602 may be any wired or wireless communication link or network link. The connections 611, 613, 615 between the remote displays 612, 614, 616 and the VT capture controller 602 may be any wired or wireless communication link or network link. Exemplary displays include television displays, monitor displays, displays associated with consumer communication devices, for example, cellular telephones, projection display systems and other displays and display systems. Exemplary capture devices 604 may comprise a video camera or other image acquisition system. In some of the exemplary embodiments described herein, the VT capture controller 602 may be implemented in a computing device or a computing system.

The VT capture controller 602 may generate an image of the collaborative writing surface 606 and may communicate the generated image to display devices, archival devices and other image consumption and storage locations based on the extent of a collaboration session.

Figure 7:
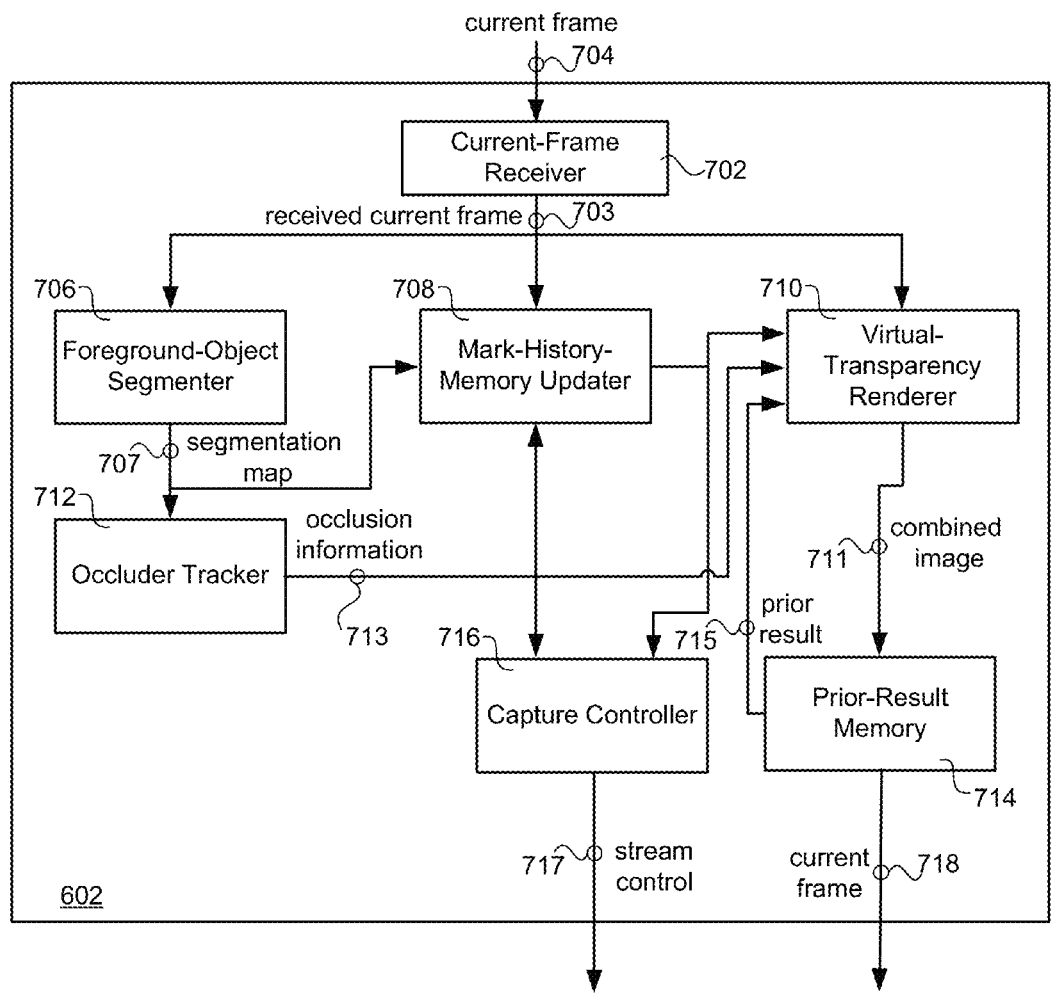
FIG. 7 is a picture depicting an exemplary virtual-transparency capture controller according to some embodiments of the present invention.

In some embodiments of the present invention described in relation to FIG. 7, a VT capture controller 602 may comprise a current-frame receiver 702 which may receive a current image frame 704, also considered a current frame, associated with a collaborative writing surface. In some embodiments, the VT capture controller 602 may receive the current frame 704 directly from a capture device that may be trained on the collaborative writing surface. In alternative embodiments, the VT capture controller 602 may receive the current frame from a preprocessor (not shown) which may preprocess the raw sensor data obtained by the capture device. Exemplary preprocessing may include demosaicing, image rectification, region-of-interest extraction and other preprocessing. Demosaicing may reconstruct coincident three-color output data from non-coincident samples obtained by a camera filter array. Exemplary embodiments of the present invention may comprise a Bayer filter array in the capture device and may comprise methods and systems known in the art for demosaicing color data obtained from a Bayer filter array. Alternative demosaicing methods and systems known in the art may be used when the capture device sensor array is a non-Bayer filter array. Image rectification may eliminate, in the image data, perspective distortion introduced by the relative position of the capture device and the collaborative writing surface. The current-frame receiver 702 may make the received current frame 703 available to a foreground-object segmenter 706, a mark-history-memory updater 708 and a virtual-transparency renderer 710.

The foreground-object segmenter 706 may process the received current frame 703 to generate a labeled image 707, also considered a segmentation map and a foreground mask, in which each image region may be labeled as writing-surface content or as a foreground object, for example, an occluder. A person having ordinary skill in the art will recognize there are many techniques known in the art to perform foreground-object segmentation, for example, frame-by-frame motion estimation techniques, chroma key segmentation techniques, learned writing-surface color-modeling based techniques, active depth sensing and other segmentation techniques. In some embodiments of the present invention, an adaptive color-background model that changes with sensed room lighting may be used for foreground-object segmentation. The segmentation map 707 may be made available from the foreground-object segmenter 706 to an occluder tracker 712.

The occluder tracker 712 may track, over time, the foreground objects identified in the segmentation map 707 and may determine when the collaborative writing surface may be occluded. The occluder tracker 712 may also determine the level of activity in the scene and may compensate for foreground-object segmentation errors. In some embodiments of the present invention, the occluder tracker 712 may estimate foreground-object motion trajectories and magnitudes and use these measures to differentiate random jitter due to segmentation errors from a more structured motion of a scribe drawing on the collaborative writing surface.

Figure 8:
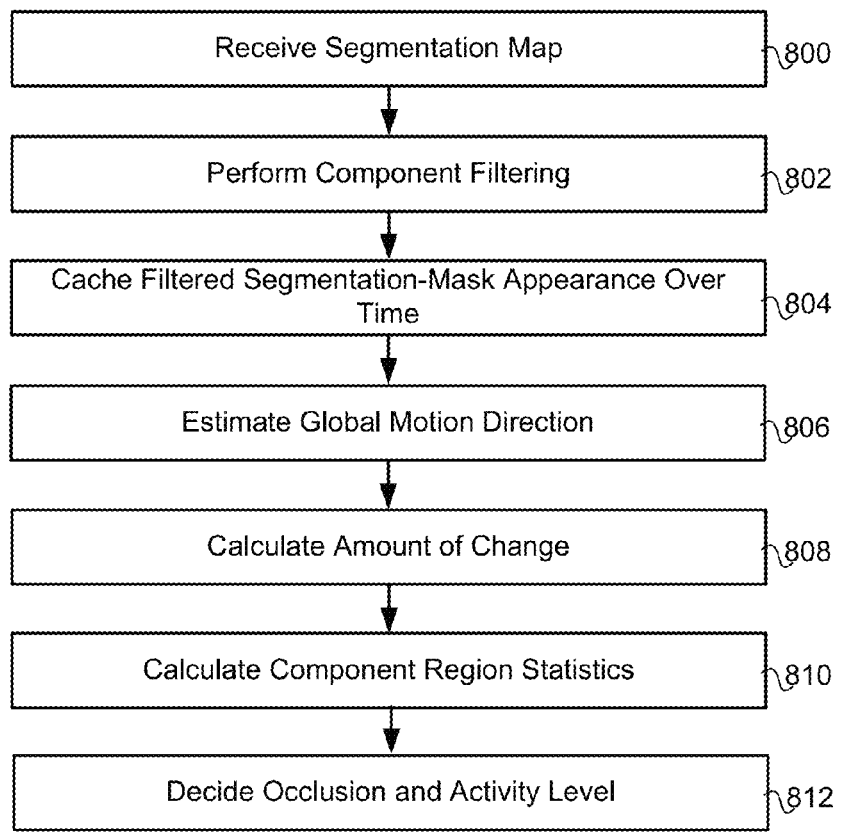
FIG. 8 is a chart showing exemplary embodiments of an occluder tracker according to the present invention.

In some embodiments of the present invention described in relation to FIG. 7 and FIG. 8, the occluder tracker 712 may receive 800 a segmentation map 707 from the foreground-object segmenter 706. The occluder tracker 712 may perform 802 component filtering to reject noise in the foreground regions. In some embodiments of the present invention, a component may be relabeled as a non-foreground component if the component is not sufficiently large and does not abut the image frame boundary. In some embodiments of the present invention, component labeling may performed according to methods and systems described in U.S. patent application Ser. No. 12/636,533, entitled "Methods and Systems for Attaching Semantics to a Collaborative Writing Surface," filed on Dec. 11, 2009, said application U.S. patent application Ser. No. 12/636,533 is hereby incorporated by reference herein, in its entirety. In some embodiments of the present invention, a component may be considered a noise component and rejected as a foreground region if the size of the component is less than 20% of the size of the image frame.

After component filtering 802, the appearance of the filtered segmentation mask, also considered the occluder mask, over time may be cached 804. In some embodiments of the present invention, OpenCV Motion Template methods may be used to update a floating point motion history image that may represent the appearance of the occluder mask over time. A global motion direction may be estimated 806 by a motion gradient estimator using the cached occluder motion history. Additionally, the motion gradient estimator may calculate 808 the amount of change within the scene. In some embodiments of the present invention, the amount of change may be the magnitude of the global motion vector. Region statistics may be calculated 810 for each foreground component. In some embodiments of the present invention, the region statistics may comprise color difference statistics and component size statistics. The occluder tracker may determine 812, based on the global motion direction, the amount of change within the scene and the region statistics, whether or not the collaborative writing surface is being occluded by a foreground object and the activity level within the scene, for example, "static" or "active." In some embodiments of the present invention, object trajectories over time may be used to differentiate a plurality of occluder states, for example, a "stationary" state in which an occluding object may not be moving significantly, an "exit" state in which the motion trajectory of an occluding object may be in a direction indicative of the object moving out of the scene, an "entrance" state in which the motion trajectory of an occluding object may be in a direction indicative of the object moving into the scene, a "writing" state in which an occluding object may be largely stationary with an oscillating motion trajectory in the up-down direction and a slowly moving left-to-right component indicative of Latin writing systems. Some embodiments may further comprise a "drawing" state different from the "writing" state. The "drawing" state may be indicated by a motion trajectory with larger, more random motion trajectories in comparison to a "writing" state. The occluder tracker 712 output may be made available to a mark-history memory updater 708, a virtual-transparency renderer 710 and a capture controller 716.

Figure 9:
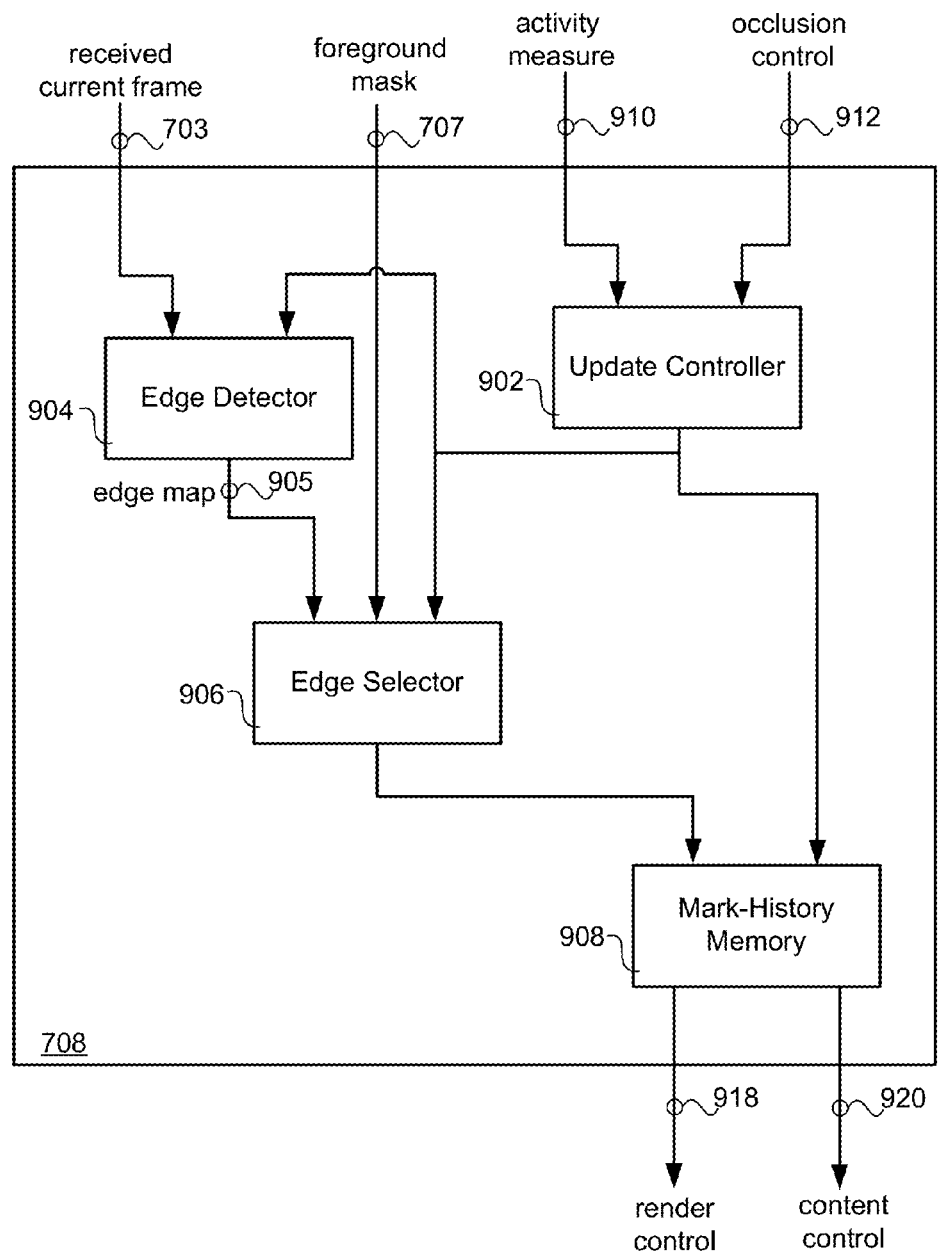
FIG. 9 is a picture depicting an exemplary mark-history-memory updater according to some embodiments of the present invention.

In some embodiments of the present invention described in relation to FIG. 7 and FIG. 9, the mark-history-memory updater 708 may cache and update a record of the content on the collaborative writing surface allowing the rendering of prior content that may not currently be observable. The mark-history memory may control the virtual transparency rendering and stream control.

The mark-history-memory updater 708 may comprise an update controller 902 that may selectively trigger an edge detector 904, an edge selector 906 and the updating of the mark-history memory 908. The update controller 902 may be used to avoid unnecessary processing during periods of inactivity and may determine how to update the mark-history memory. The update controller 902 may receive information 910, 912, from the occluder tracker 712, comprising an activity measure 910 and occlusion control information 912. The update controller 902 may determine a state associated with the scene, for example, whether the scene is static, also considered non-active, or active. The update controller 902 may also detect scene state transitions, for example, a transition from active to non-active, a transition from non-active to active, a transition from occluded to non-occluded, a transition from non-occluded to occluded, and other state transitions. In some embodiments of the present invention, scene state determination and scene state transition detection may be performed according to methods and systems described in U.S. patent application Ser. No. 12/636,533, entitled "Methods and Systems for Attaching Semantics to a Collaborative Writing Surface," filed on Dec. 11, 2009, said application U.S. patent application Ser. No. 12/636,533 is hereby incorporated by reference herein, in its entirety. The update controller 902 may control internal and follow-on processing based on the scene state or state transition. In some embodiments, when the update controller 902 determines that a scene is active or transitioning from active to static, then a control signal may be sent to an edge detector 904.

The edge detector 904 may perform edge detection upon receiving a control signal from the update controller 902. The edge detector 904 may produce an edge map, also referred to as an edge mask, 905. In some embodiments of the present invention, edge detection may be performed periodically, for example, every N frames or T seconds during active states. In an exemplary embodiment, an edge map may be produced every 0.5 seconds.

In some embodiments of the present invention, the edge detector 904 may comprise a Sobel gradient operator and a binarization process that uses a threshold set based on image-dependent scene statistics. The gradient variation of background pixel values may largely follow a Gaussian model, and existing surface marks may contribute to outliers in the distribution. The Gaussian model may be calculated by first rejecting outliers from the distribution and then estimating the model parameters from the remaining values. The binarization process threshold may be set as a multiple of the standard deviation from the estimated mean. The binarization process may be applied to the results of the Sobel gradient operator. In alternative embodiments, other gradient operators may be used.

An edge selector 906 may fuse the edge mask 905 with the foreground mask 707 to reject edges that result from an occluding object.

The mark-history memory 908 may combine the current visible edge state with the prior edge state. As content is added or removed from the collaborative writing surface, the mark-history memory may be updated to reflect these changes and content control signals 920 may be passed to other modules to indicate magnitude and type of change. In one exemplary embodiment, the mark-history memory 908 may be updated by a logical "OR" operation between the previous memory and the result of the edge selector 906. The mark-history memory 908 may become full of outdated edges that may have been erased. To reduce the amount of stale information in the mark-history memory 908, in some embodiments, a procedure to remove stale information may be run during periods of inactivity. In alternative embodiments, the information in the mark-history memory 908 may have an associated age limit after which the system may be required to confirm the stored information. In these embodiments, a region that is not occluded by a foreground object may be required to be verified periodically, while an occluded region may retain old marks until after dis-occlusion at which time verification may be performed. In some embodiments, a mark location may be reset to a default value, and then in follow-on frames, if the unoccluded location did not contain a mark, the value may be decremented until the mark-history memory no longer records a mark in the location. These embodiments may tolerate noise detection by requiring several states of confirmation before a mark may be erased from the mark-history memory 908.

Render control 918, the received current frame 703, the prior result 715, the occlusion control 713 and the content control 920 may be made available to the virtual-transparency renderer 710. The virtual transparency renderer 710 may comprise logic to combine, or blend, the received current frame 703 with the prior result 715. In some embodiments, the virtual-transparency renderer 710 may produce a visual representation 711, 718 of the collaborative writing surface in which occluding foreground objects may be rendered transparent, or partially transparent, and the occluded portions of the present frame may be rendered based on corresponding portions of the prior result image 715. In some embodiments, the virtual-transparency renderer 710 may produce a visual representation 711, 718 of the collaborative writing surface in which occluding foreground objects may be rendered as silhouettes, and the occluded portions of the present frame may be rendered based on corresponding portions of the prior result image 715. During periods of inactivity when no new content is being added or in which current content is not being removed from the collaborative writing surface, the virtual-transparency renderer 710 may not be active as there is no need to blend information from prior frames and the current frame. During periods of activity, the virtual-transparency renderer 710 may use a blending mask to select pixels from the current frame 703 or the prior result 715. The blending mask may be determined based on the values in the foreground object mask and the mark-history memory. The blending mask may be formed to indicate that the value of a pixel at a pixel location may be selected from the current frame 703 for unoccluded marker locations and from the prior result 715 for occluded regions or non-marked locations. In some embodiments, the current frame 703 and the prior result 715 may be blended using an alpha blending method. In these embodiments, the prior result 715 may slowly change into values from the new frames. In some embodiments, the blending strength may controlled by a confidence value associated with a location. The confidence value associated with a location may reflect a confidence level that the edge location contains a mark or a confidence level that the location is mislabeled as a foreground object. The virtual-transparency renderer 710 may write the resulting combined image 711 to the prior-result memory 714. The resulting combined image 711 may be available from the prior-result memory 714 as the current output frame 718.

In alternative embodiments of the present invention, the rendered image 711 may be enhanced using image processing methods and systems. In some exemplary embodiments, the collaborative writing surface illumination variation may be normalized and color balance corrected. Some exemplary embodiments comprise a sharpening filter to improve the legibility of the marks on the image of the collaborative writing surface. In some embodiments of the present invention, the virtual-transparency renderer 710 may comprise the enhancement functionality. In alternative embodiments (not shown), the results of the virtual-transparency renderer may be available to an image enhancer which then may make the enhanced image results available to the prior-result memory.

The capture controller 716 may comprise logic to control the broadcast and routing of the virtual transparency result to other system components. A stream control signal 717 may be sent to display systems associated with a collaboration system to indicate new information is available for display. A stream control signal 717 may be sent to a system archive module to store significant changes to the record of the collaborative writing surface content. Alternatively, meta-data associated with the collaboration session may be passed via the stream control 717 to denote regions-of-interest, actor identification, semantic attachments and other collaboration session information. In some embodiments of the present invention, meta-data may be identified according to methods and systems described in U.S. patent application Ser. No. 12/636,533, entitled "Methods and Systems for Attaching Semantics to a Collaborative Writing Surface," filed on Dec. 11, 2009, said application U.S. patent application Ser. No. 12/636,533 is hereby incorporated by reference herein, in its entirety.

Although the charts and diagrams in the figures described herein may show a specific order of execution, it is understood that the order of execution may differ from that which is depicted. For example, the order of execution of the blocks may be changed relative to the shown order. Also, as a further example, two or more blocks shown in succession in a figure may be executed concurrently, or with partial concurrence. It is understood by those with ordinary skill in the art that software, hardware and/or firmware may be created by one of ordinary skill in the art to carry out the various logical functions described herein.

Some embodiments of the present invention may comprise a computer-program product that is a computer-readable storage medium, and/or media, having instructions stored thereon, and/or therein, that may be used to program a computer to perform any of the features presented herein.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A non-transitory computer readable medium encoded with a computer program code for causing a computing system to execute a method for forming an image of a collaborative writing surface, said method comprising:
   determining an occluded portion of a current frame, wherein said determining comprises tracking an occluder and said tracking comprises:
   receiving a segmentation mask;
   performing component filtering on said segmentation mask;
   caching said filtered segmentation mask, thereby producing a filtered segmentation mask appearance over time;
   estimating a global motion direction based on said appearance over time; and
   determining a magnitude associated with said global motion direction; and
   blending a prior result image with said current frame, wherein said occluded portion of said current frame is rendered based on a corresponding portion of said prior result image.

2. The computer readable medium as described in claim 1, said method further comprising imaging said occluder as partially transparent in said image of said collaborative writing surface.

3. The computer readable medium as described in claim 1, said method further comprising imaging said occluder as a silhouette in said image of said collaborative writing surface.

4. The computer readable medium as described in claim 1, said method further comprising:
   determining an activity level associated with said collaborative writing surface; and
   performing said blending only when said activity level indicates a change in the content on said collaborative writing surface.

5. The computer readable medium as described in claim 1, said method further comprising preprocessing a captured frame to form said current frame.

6. The computer readable medium as described in claim 5, said method further comprising correcting said captured frame for perspective distortion and cropping said corrected captured frame to a region-of-interest associated with said collaborative writing surface to form said current frame.

7. The computer readable medium as described in claim 1, wherein said collaborative writing surface is a surface selected from the group consisting of flipchart, a whiteboard, a chalkboard and a piece of paper.

8. A collaboration system comprising:
   a collaborative writing surface;
   a capture device for acquiring a captured image corresponding to said collaborative writing surface; and
   a virtual-transparency capture controller for forming an image of said collaborative writing surface, wherein said image is a blended version of a prior result image with a current frame related to said captured image, wherein an occluded portion of said current frame is rendered based on a corresponding portion of said prior result image; and
   wherein said virtual-transparency capture controller comprises:
   a foreground-object segmenter for identifying an occluder in said current frame; and
   an occluder tracker for tracking said occluder.

9. The system as described in claim 8, wherein said collaborative writing surface is a surface selected from the group consisting of flipchart, a whiteboard, a chalkboard and a piece of paper.

10. The system as described in claim 8 further comprising an image rectifier for eliminating perspective distortion in said captured image to form said current frame.

11. The system as described in claim 8 further comprising an image demosaicer for demosaicing said captured image to form said current frame.

12. The system as described in claim 8, wherein said occluder is imaged as partially transparent in said image of said collaborative writing surface.

13. The system as described in claim 8, wherein said occluder is imaged as a silhouette in said image of said collaborative writing surface.

14. The system as described in claim 8, wherein said occluder tracker comprises:
   a segmentation-mask receiver for receiving a segmentation mask;

a component filter for performing component filtering on said segmentation mask;

a cache for caching said filtered segmentation mask, thereby producing a filtered segmentation mask appearance over time;

a motion estimator for estimating a global motion direction based on said appearance over time; and a magnitude determiner for determining a magnitude associated with said global motion direction.

15. The system as described in claim 8, wherein said virtual-transparency capture control performs said blending only when an activity level indicates a change in the content on said collaborative writing surface.

16. The system as described in claim 8 further comprising an image enhancer for enhancing said image of said collaborative writing surface.

* * * * *